Oct. 29, 1957  B. A. TANNAHILL  2,811,030
CAKE CANDLE HOLDER
Filed Nov. 20, 1956
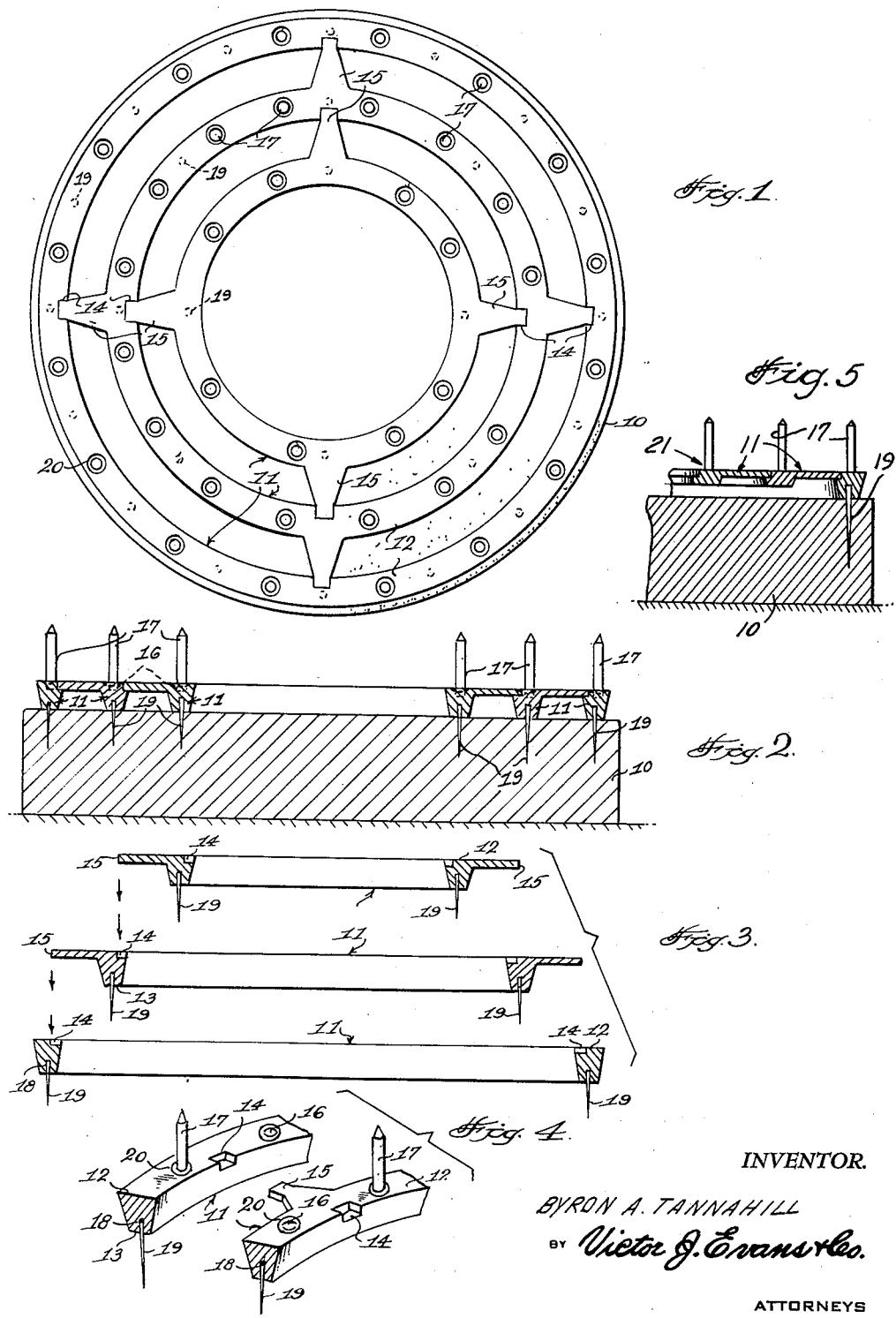
INVENTOR.
BYRON A. TANNAHILL
BY Victor J. Evans & Co.
ATTORNEYS

United States Patent Office 2,811,030
Patented Oct. 29, 1957

2,811,030

CAKE CANDLE HOLDER

Byron A. Tannahill, Las Vegas, Nev.

Application November 20, 1956, Serial No. 623,382

3 Claims. (Cl. 67—25)

This invention relates to a cake, and more particularly to a candle holder for a cake.

The object of the invention is to provide a candle holder which will permit a plurality of candles to be supported without detracting from the beauty of the cake.

Another object of the invention is to provide a cake candle holder which includes a plurality of concentrically arranged rings, the rings being provided with interengaging means whereby the rings can be releasably connected together, there being legs depending from the rings for engaging the cake, and whereby the rings are provided with sockets for receiving the lower ends of candles.

A further object of the invention is to provide a cake candle holder which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a top plan view of the cake candle holder constructed according to the present invention.

Figure 2 is a vertical sectional view taken through the holder of the present invention and showing the holder mounted on a cake and with candles supported thereby.

Figure 3 is a sectional view similar to Figure 2 but showing the rings separated from each other.

Figure 4 is a fragmentary perspective view illustrating several of the rings, and with parts broken away and in section.

Figure 5 is a fragmentary sectional view illustrating a modification.

Referring in detail to the drawings, the numeral 10 indicates a cake, such as a birthday cake, which is adapted to have one or more of the rings 11 arranged thereon, and the rings 11 may each have a trapezoidal shape in cross section as shown in Figure 4 so that the upper edge of a ring as indicated by the numeral 12 is of greater width than the lower end 13.

Certain of the rings 11 are provided with grooves 14 in their upper surfaces for a purpose to be later described. There is further provided a plurality of arms or tongues 15 which extend radially outwardly from certain of the rings 11, and the arms 15 are adapted to snugly seat in the grooves 14 whereby the rings can be releasably connected together.

The upper surface of each of the rings 11 is further provided with a plurality of spaced apart sockets or recesses 16, and the sockets 16 are adapted to snugly receive the lower ends of candles 17. The lower surfaces of the rings 11 are provided with a plurality of recesses 18, and legs 19 are adapted to be snugly seated in the recesses 18, the legs 19 projecting downwardly into the cake 10 as shown in Figure 2 whereby the rings are anchored to the cake. The legs 19 may consist of toothpicks.

From the foregoing it is apparent that there has been provided a candle holder for use with a cake such as a birthday cake, and in use one or more of the rings 11 are adapted to be mounted on top of the cake 10, as for example, as shown in Figure 2. The rings 11 are arranged in concentric relation with respect to each other, and the rings 11 are maintained in their proper spaced apart relation by means of the arms 15 which snugly engage the grooves 14. Furthermore, the rings are maintained connected to the cake 10 through the medium of the legs 19 which extend downwardly into the cake. The legs 19 may consist of toothpicks, and the upper ends of the legs 19 may be seated in the recesses 18 which are arranged in the bottom of the rings. Furthermore, each of the rings 11 is provided with a plurality of downwardly extending sockets or recesses 16 which are adapted to snugly receive the lower ends of candles 17. Thus, with the present invention any wax or drippings from the candles 17 will be collected on the rings 11 so that the cake will not be messed up. Also, the ring arrangement insures that the candles will be properly and attractively spaced on the cake.

Thus, it will be seen that there has been provided a device which serves to support candles such as candles which are to be used on a birthday cake, and the rack of the present invention is highly decorative. The rings can be made of any suitable material and in any desired size or shape, as for example, the rings may be made of plastic. The upper and lower surfaces of the rings are flat, and portions of the rings adjacent the socket 16 may be cupped out or recessed as at 20 so that the drippings from the candles will be collected therein and whereby these drippings will not fall onto the cake. The openings 16 which receive the candles 17 may be of standard size so that they can receive the candles 17 snugly therein.

With the present invention candles can be mounted on the cake without messing up the beauty of the icing or decorations and the candles can be lit and blown out while being supported in the holder of the present invention. The only marks left on the cake or icing will be from the small toothpicks or legs 19 and if desired the rings can be made of a transparent material such as glass or plastic so that there will be no interference with the beauty of the cake. As previously described, the rings can be used individually or else they can be used together as shown in Figures 1 and 2. Furthermore, certain of the openings 16 can be used to receive decorations such as rosebuds or the like in the event that candles are not placed in all of the openings. The rings can be fitted on cakes of different shapes or sizes and the rings are of different sizes so that they can fit within each other as shown in the drawings. Also, the legs 19 can be of different sizes as desired. As previously described, certain of the rings have the grooves 14, while other of the rings have the arms 15 which snugly seat in the grooves 14 and when only a few candles are being supported, then one ring may suffice, but where a plurality of candles are being supported, then more rings may be used.

When using more than one ring, as for example, as shown in the modification in Figure 5, it is only necessary to have legs on the outer ring since the inner ring interlocks in the outer ring and therefore does not require legs, the modification illustrated in Figure 5 being indicated generally by the numeral 21. Furthermore, the legs may be made of a suitable plastic material which may be similar to plastic toothpicks.

I claim:

1. In a candle holder for a cake, a plurality of concentrically arranged rings, each of said rings having the shape of a trapezoid in cross section so that the upper end thereof is wider than the lower end thereof, there being a recessed portion in the upper surface of certain of said rings, a plurality of radially extending arms projecting outwardly from certain of said rings and seated in said recessed portion, there being a plurality of sockets extending downwardly from the upper surfaces of said rings for receiving the lower ends of candles, there being a plurality of spaced apart recesses in the bottom of said rings, and vertically disposed spaced parallel legs having their upper ends seated in said recesses and their lower ends projecting into the cake.

2. In a candle holder for a cake, a plurality of concentrically arranged rings, each of said rings having the shape of a trapezoid in cross section so that the upper end thereof is wider than the lower end thereof, there being a recessed portion in the uper surface of certain of said rings, a plurality of radially extending arms projecting outwardly from certain of said rings and seated in said recessed portion, there being a plurality of sockets extending downwardly from the upper surfaces of said rings for receiving the lower ends of candles, there being a plurality of spaced apart recesses in the bottom of said rings, and vertically disposed spaced parallel legs having their upper ends seated in said recesses and their lower ends projecting into the cake, portions of said rings adjacent said sockets being cupped out for receiving drippings from the candles.

3. In a candle holder for a cake, a plurality of rings, there being a recessed portion in the upper surface of certain of said rings, a plurality of arms projecting outwardly from certain of said rings and seated in said recessed portion, there being a plurality of sockets extending downwardly from the upper surfaces of said rings for receiving the lower ends of candles, there being a plurality of spaced apart recesses in the bottom of said rings, and legs having their upper ends seated in said recesses and their lower ends projecting into the cake.

References Cited in the file of this patent
UNITED STATES PATENTS

| | | |
|---|---|---|
| 1,511,004 | Pooch et al. | Oct. 7, 1924 |
| 1,935,831 | Cunningham | Nov. 21, 1933 |